US012640812B2

(12) United States Patent
Wang et al.

(10) Patent No.: US 12,640,812 B2
(45) Date of Patent: May 26, 2026

(54) GROUND-HIGH ALTITUDE PLATFORM-SATELLITE LASER COMMUNICATION SYSTEM AND METHOD BASED ON ANISOTROPIC NON-KOLMOGOROV TURBULENCE

(71) Applicant: China Jiliang University, Hangzhou (CN)

(72) Inventors: Yi Wang, Hangzhou (CN); Xingyue Guo, Hangzhou (CN); Dexian Yan, Hangzhou (CN)

(73) Assignee: CHINA JILIANG UNIVERSITY, Hangzhou (CN)

( * ) Notice: Subject to any disclaimer, the term of this patent is extended or adjusted under 35 U.S.C. 154(b) by 280 days.

(21) Appl. No.: 18/657,792

(22) Filed: May 8, 2024

(65) Prior Publication Data

US 2024/0380487 A1    Nov. 14, 2024

(30) Foreign Application Priority Data

May 8, 2023    (CN) .......................... 202310507082.8

(51) Int. Cl.
| | |
|---|---|
| *H04B 10/40* | (2013.01) |
| *G01S 17/10* | (2020.01) |
| *H04B 7/185* | (2006.01) |
| *H04B 7/195* | (2006.01) |
| *H04B 10/118* | (2013.01) |
| *H04B 10/16* | (2006.01) |

(52) U.S. Cl.
CPC ....... *H04B 10/118* (2013.01); *H04B 7/18504* (2013.01); *H04B 7/18513* (2013.01); *H04B 7/195* (2013.01)

(58) Field of Classification Search
None
See application file for complete search history.

(56) References Cited

U.S. PATENT DOCUMENTS

| | | | |
|---|---|---|---|
| 11,588,666 B2 * | 2/2023 | Tung | .................... H04J 13/0011 |
| 11,962,847 B1 * | 4/2024 | Chang | .............. H04N 21/43635 |
| 2012/0261516 A1 * | 10/2012 | Gilliland | ................ B64D 47/00 |
| | | | 356/4.01 |

(Continued)

*Primary Examiner* — Sai Aung

(57) ABSTRACT

A ground-high altitude platform-satellite (G-H-S) laser communication system and method based on anisotropic non-Kolmogorov turbulence are provided, and the system includes a ground transmitting terminal, a HAP, a satellite terminal, a ground-HAP uplink and an HAP-satellite uplink. When laser beams are transmitted upwards from the ground transmitting terminal and through the HAP, the laser beams are affected light intensity scintillation, beam drift, and angle of arrival fluctuation, and are transmitted through vacuum channels and received by receiving antenna of the satellite terminal. The HAP is located at stratosphere, and an anisotropic non-Kolmogorov turbulence model is suitable for analyzing turbulence effect in stratosphere. Thus, the anisotropic non-Kolmogorov turbulence model is used to research transmission characteristics of the laser beams. Meanwhile, a hexagon quadrature amplitude modulation (HQAM) is used in the G-H-S laser communication system, which optimizes system performances on basis of improving communication quality, and enhances stability of communication links.

6 Claims, 4 Drawing Sheets

Ground transmitting terminal

(56)                     References Cited

U.S. PATENT DOCUMENTS

| | | | |
|---|---|---|---|
| 2013/0002472 A1* | 1/2013 | Crouch | G01S 7/4863 |
| | | | 342/370 |
| 2013/0202299 A1* | 8/2013 | Prakash | H04J 14/0271 |
| | | | 398/51 |
| 2016/0374042 A1* | 12/2016 | Koehler | H04L 27/2663 |
| 2021/0181310 A1* | 6/2021 | Lu | G01S 7/4818 |
| 2023/0050363 A1* | 2/2023 | Yang | G01S 7/4911 |

* cited by examiner

GROUND-HIGH ALTITUDE PLATFORM-SATELLITE LASER COMMUNICATION SYSTEM AND METHOD BASED ON ANISOTROPIC NON-KOLMOGOROV TURBULENCE

CROSS-REFERENCE TO RELATED APPLICATION

This application claims priority to Chinese Patent Application No. 202310507082.8, filed May 8, 2023, which is herein incorporated by reference in its entirety.

TECHNICAL FIELD

The disclosure relates to the field of free space optical communication technologies, and more particularly to a ground-high altitude platform-satellite (G-H-S) laser communication system and method based on anisotropic non-Kolmogorov turbulence.

BACKGROUND

In recent years, satellite laser communication has received widespread attention due to its advantages of large capacity, high safety, good confidentiality, wide coverage, low power consumption, and low cost. The satellite laser communication includes inter-satellite laser communication and satellite-ground laser communication. The satellite-ground laser communication is easy to be affected by external factors. A laser beam is obstructed by clouds during transmission, which can cause jitter and divergence, so as to reduce a communication performance of a communication system, and even cause interruption of communication links in severe cases. In addition, atmospheric turbulence is also an important factor affecting laser transmission. A refractivity caused by near-surface turbulence is irregularly changed in space and time when the laser beam passes through an atmospheric channel, which causes random variations in laser parameters transmitted in the atmosphere, so as to seriously affect a transmission quality of the laser beam. For an uplink and a downlink, the uplink is affected not only by a scintillation effect of light intensity and an angle of arrival (AOA) fluctuation but also by a phenomenon of beam wander. A diameter of a transmission beam of the downlink is greatly larger than a vortex scale of the atmosphere when the transmission beam of the downlink arrives the atmosphere, thus an influence of the beam wander on the communication system can be ignored. Therefore, an influence of the atmospheric turbulence on the uplink is more complex.

A high-altitude platform (HAP) not only has advantages of low cost, easy to deploy and high communication quality, but also has flexibility and mobility, as well as can adjust a spatial position to avoid cloud interference and optimize the transmission quality of the laser beam, and can be used to assist the satellite laser communication. In recent years, research on the HAP focuses on a backhaul communication between ground and the HAP. There is relatively less research on the HAP in ground-satellite uplink optical communication and satellite-ground downlink optical communication. However, an isotropic Kolmogorov turbulence model is adopted for an existing study on the HAP in a satellite laser communication system. Since an altitude of the HAP is 17 kilometers (km) to 32 km above the ground and not in atmospheric troposphere, thus an adoption of the isotropic Kolmogorov turbulence model of troposphere cannot better analyze an influence of eddy currents on optical wave transmission in turbulent random media, and there is a significant gap compared to an actual situation.

Commonly used modulation techniques in a satellite-ground laser communication system include a differential phase shift keying (DPSK), a minimum shift keying (MSK) and a quadrature amplitude modulation (QAM). However, energy efficiency of the DPSK is low, spectrum utilization of the MSK is not high, and the traditional QAM has a higher peak to average power ratio (PAPR) and a more complex system.

SUMMARY

A purpose of embodiments of the disclosure is to provide a G-H-S laser communication system and method based on anisotropic non-Kolmogorov turbulence, to improve a communication performance of a ground-satellite uplink system. The HAP used in the disclosure is located in stratosphere, and an anisotropic non-Kolmogorov turbulence model is more suitable for analyzing turbulent effects in the stratosphere. Therefore, the disclosure adopts the anisotropic non-Kolmogorov turbulence model to research transmission characteristics of laser beams. Meanwhile, a hexagon quadrature amplitude modulation (HQAM) is applied in the G-H-S laser communication system, which optimizes performances of the communication system effectively on a basis of improving communication quality, and enhances stability of communication links, thus having important theoretical significance and application value.

According to a first aspect of the embodiments of the disclosure, a G-H-S laser communication system based on anisotropic non-Kolmogorov turbulence is provided, and the G-H-S laser communication system includes a ground transmitting terminal (i.e., satellite earth station), a HAP, a satellite terminal (i.e., satellite), an uplink between the ground transmitting terminal and the HAP (i.e., a ground-HAP uplink), and an uplink between the HAP and the satellite terminal (i.e., an HAP-satellite uplink).

The ground transmitting terminal includes a laser transmitter and a Mach-Zehnder (MZ) modulator. The laser transmitter is configured to transmit laser beams to the MZ modulator. The MZ modulator is configured to modulate the laser beams to obtain laser signals with different intensities after receiving the laser beams and transmit the different laser signals to the HAP.

The HAP is a geostationary satellite as a relay station, the HAP is located at stratosphere, and the HAP is configured to analyze atmospheric turbulence parameters during transmitting the laser beams from the ground transmitting terminal to the HAP by using an anisotropic non-Kolmogorov turbulence model of the stratosphere, and the atmospheric turbulence parameters indicate an effect of an anisotropy factor on transmission characteristics of the laser beams. The HAP includes a multi-aperture receiver, and the multi-aperture receiver is configured to receive the laser signals from branches of the multi-aperture receiver, perform in-phase processing on the laser signals to obtain processed laser signals, combine the processed laser signals by using an equal gain combination (EGC) method to obtain combined laser signals, and transmit the combined laser signals to the satellite terminal through a vacuum channel.

The satellite terminal includes an optical receiving antenna, a photodetector, a preamplifier and a demodulator. The optical receiving antenna is configured to receive the combined laser signals, and send the combined laser signals to the photodetector; the photodetector is configured to convert the combined laser signals to electrical signals; the preamplifier is configured to amplify the electrical signals to obtain amplified electrical signals; and the demodulator is configured to demodulate the amplified electrical signals to obtain original information.

The uplink between the ground transmitting terminal and the HAP, and the uplink between the HAP and the satellite terminal are free-space optical communication (FSO) links, and the uplink between the ground transmitting terminal and the HAP, and the uplink between the HAP and the satellite terminal are configured to apply an HQAM to relieve an atmospheric turbulence effect, to thereby achieve data communication.

In an embodiment, an altitude of the HAP is 17 to 32 km above the ground, belonging to the stratosphere. In the stratosphere, transparency is good, air is extremely dry, and is less affected by weather phenomena such as cloud, rain and fog, and a spatial environment of the stratosphere is an ideal laser transmission channel.

In an embodiment, the HAP is located at the stratosphere, and a non-Kolmogorov effect of atmospheric turbulence in the stratosphere is more significant. Meanwhile, the atmospheric turbulence in upper atmosphere will exhibit power law deviations from a normal Kolmogorov atmospheric turbulence value, especially with significant differences in turbulence scales, and exhibiting a strong anisotropy. Therefore, the anisotropic non-Kolmogorov turbulence model can better describe an effect of vortex on optical wave propagation in turbulent random media, and a power law spectrum of the anisotropic non-Kolmogorov turbulence model in the stratosphere is expressed as follows:

$$\phi_n(\kappa, h) = A(\alpha)\tilde{C}_n^2(h)\frac{\exp\left(\frac{\kappa^2}{\kappa_m^2}\right)}{\left(\kappa^2 + \kappa_0^2\right)^{\alpha/2}}, 0 \le \kappa < \infty, 3 < \alpha < 4;$$

where $$\tilde{C}_n^2(h)$$

represents a generalized structural constant in the anisotropic non-Kolmogorov turbulence, K represents a spatial frequency, h represents an altitude of the anisotropic non-Kolmogorov turbulence, n represents an atmospheric refractive index, a represents a power-law index, $$\kappa_m = \frac{C(\alpha)}{l_0}, \kappa_0 = \frac{2\pi}{L_0}, C(\alpha) = \left[\left(\frac{2\pi}{3}\right)\Gamma(5 - 0.5\alpha)A(\alpha)\right]^{1/(\frac{\alpha}{5})},$$

$$A(\alpha) = 0.25\pi^{-2}\Gamma(\alpha - 1)\cos(0.5\pi\alpha),$$

$l_0$ represents an inner scale of the anisotropic non-Kolmogorov turbulence, and $L_0$ represents an outer scale of the anisotropic non-Kolmogorov turbulence.

In an embodiment, the satellite terminal is a lower Earth orbit (LEO) satellite, and is located at an altitude of 1000-5000 km from the ground. The satellite terminal is configured to perform ground communication, observation, and navigation.

In an embodiment, a principle of the HQAM is as follows: original data is divided into two paths at a transmitter, a speed of data in each path is changed to half of a speed of the original data, the data in each path is converted to a multilevel signal through a bit encoder, and the multilevel signals in each path is multiplied with a pair of orthogonal modulation carriers to obtain a modulated signal, and the modulated signals in the two paths are summed and then output.

In an embodiment, the HQAM applies a bidirectional modulator to decompose the multilevel signal into two components including an in-phase and a quadrature-phase, modulate the in-phase and the quadrature-phase of the multilevel signal onto the orthogonal modulation carriers respectively, to thereby transmit a plurality of data symbols, and an expression of the modulated signal s(t) is expressed as follows:

$$s(t) = \sqrt{\frac{2}{T}}(A_i\cos(wt) + B_j\sin(wt));$$

$$A_i = \pm(2i - 1);$$

$$B_j = \pm(2i - 1);$$

where $A_i$ and $B_j$ represent amplitudes of the in-phase and the quadrature-phase, w represents an angular frequency, i and j are positive integers, and T represents a period.

According to a second aspect of the embodiments of the disclosure, a communication method of the G-H-S laser communication system based on the anisotropic non-Kolmogorov turbulence is provided, and the communication method includes:

step 1, transmitting, by the ground transmitting terminal, the laser beams; and obtaining the laser signals through the MZ modulator, and transmitting the laser signals to the HAP upwards through the uplink between the ground transmitting terminal and the HAP;

step 2, receiving, by the multi-aperture receiver of the HAP, the laser signals, decoding, by using a decode-forward relay protocol, the laser signals to obtain a decoded result, recoding the decoded result to obtain recoded laser signals, and combining, by using the EGC method, the recoded signals to obtain combined laser signals;

step 3, transmitting, by the HAP, the combined laser signals to the satellite terminal upwards through the vacuum channel; and step 4, receiving, by the satellite terminal, the combined laser signals transmitted from the HAP.

Technical solutions provided by the embodiments of the disclosure can include the following beneficial effects.

According to the above embodiments, the disclosure provides a G-H-S laser communication system and method based on the anisotropic non-Kolmogorov turbulence, and the HAP is used as a relay station to adjust a spatial position, to thereby relieve cloud interference and optimize the transmission quality of the laser beams. Meanwhile, the HAP has advantages of high frequency spectrum utilization rate, low power and easy maintenance, which can expand a communication range, support long distance transmission, and achieve a backhaul laser communication between the ground and the satellite. In addition, the HAP is located at the stratosphere, and the non-Kolmogorov effect of the atmospheric turbulence in the stratosphere is more significant, and an adoption of the anisotropic non-Kolmogorov turbulence model can more accurately describe features of the atmospheric turbulence. However, the G-H-S laser communication system using the HQAM has a lower bit error rate (BER). The HQAM can effectively relieve the atmospheric turbulence effect, and achieve high-speed data communication. The HQAM helps to improve the communication performance of the G-H-S laser communication system, and on a basis of optimizing system performance, it enhances the stability of the communication links.

It should be understood that the general description above and a detailed description in the following text are merely illustrative and explanatory, and cannot limit the disclosure.

BRIEF DESCRIPTION OF DRAWINGS

Drawings here are incorporated into the specification and form a part of the specification, illustrating embodiments in accordance with the disclosure and used together with the specification to describe principles of the disclosure.

DETAILED DESCRIPTION OF EMBODIMENTS

Embodiments will be described in detail, and examples of the embodiments are illustrated in drawings. Unless otherwise indicated, same numbers in different drawings indicate the same or similar elements when the following description refers to the drawings. Implementation methods described in the following embodiments do not represent all embodiments consistent with the disclosure. On the contrary, they are merely examples of devices and methods consistent with some aspects of the disclosure as detailed in claims.

Terms used in the disclosure are for a purpose of describing specific embodiments only and are not intended to limit the disclosure. Unless the context clearly indicates otherwise, singular forms "a", "the" and "this" used in the disclosure and the claims are also intended to include majority forms. It should also be understood that a term "and/or" used in the specification refers to and includes any or all possible combinations of one or more related listed items.

Figure 1:
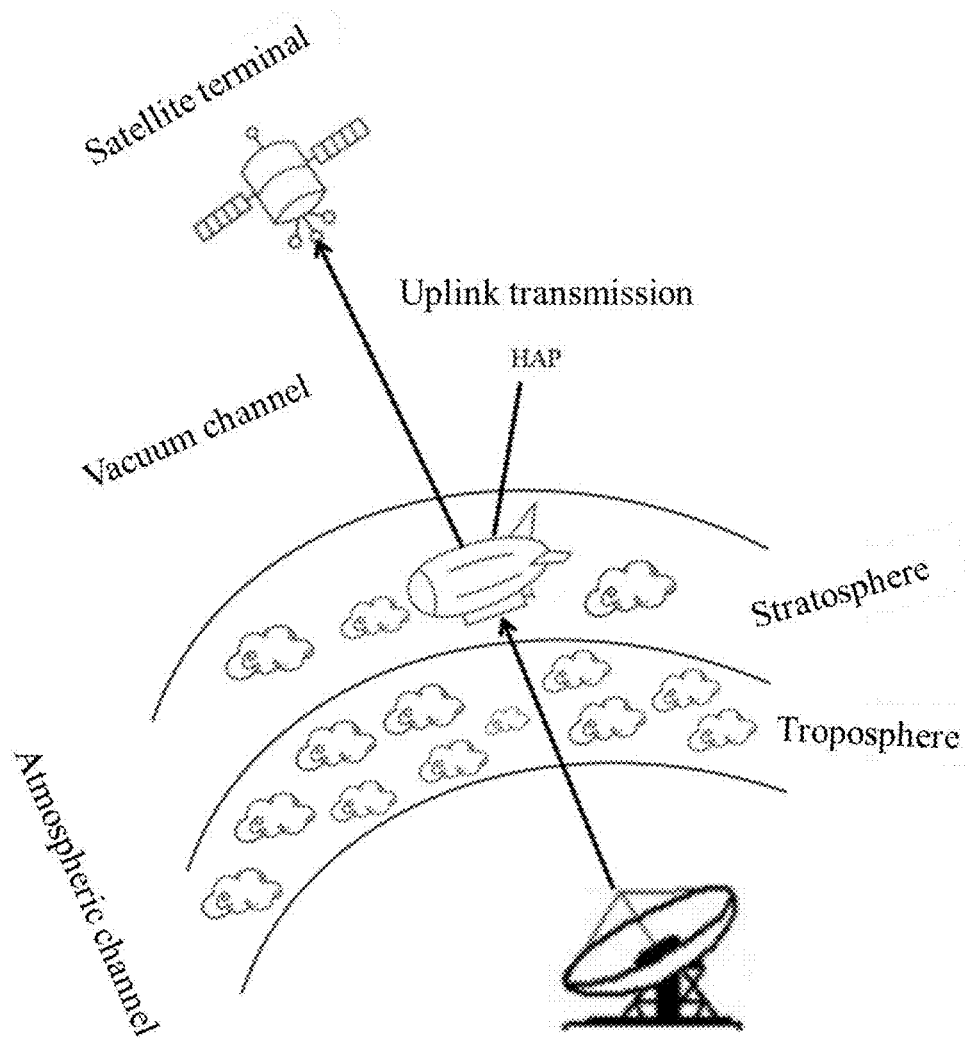
FIG. 1 illustrates a schematic diagram of a G-H-S laser communication system based on anisotropic non-Kolmogorov turbulence according to an embodiment of the disclosure.
Figure 4:
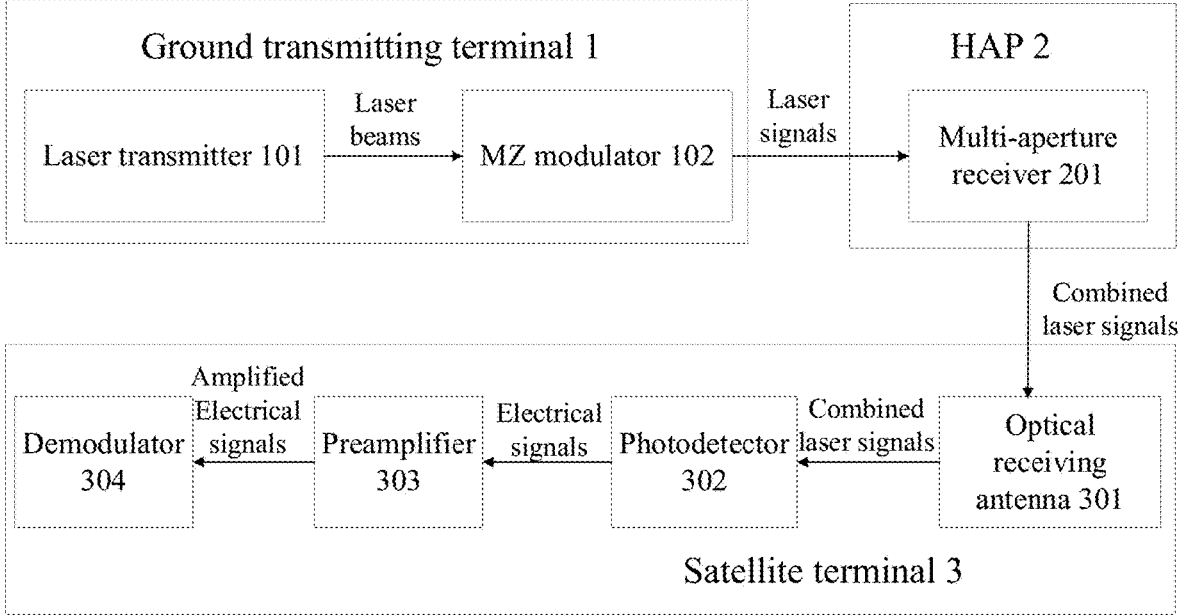
FIG. 4 illustrates a schematic diagram of a communication process of the G-H-S laser communication system based on the anisotropic non-Kolmogorov turbulence according to an embodiment of the disclosure.

FIG. 1 illustrates a schematic diagram of a G-H-S laser communication system based on anisotropic non-Kolmogorov turbulence model according to an embodiment of the disclosure. As illustrated in FIG. 1 and FIG. 4, the G-H-S laser communication system includes a ground transmitting terminal 1, a HAP 2, a satellite terminal 3, an uplink between the ground transmitting terminal 1 and the HAP 2 (i.e., a ground-HAP uplink), and an uplink between the HAP 2 and the satellite terminal 3 (i.e., an HAP-ground uplink).

The ground transmitting terminal 1 includes a laser transmitter 101 and a MZ modulator 102. The laser transmitter 101 is configured to transmit laser beams to the MZ modulator 102. The MZ modulator 102 is configured to modulate the laser beams to obtain laser signals with different intensities after receiving the laser beams and transmit the different laser signals to the HAP 2.

The HAP 2 is a geostationary satellite as a relay station, the HAP 2 is located on stratosphere, and the HAP 2 is configured to analyze atmospheric turbulence parameters during transmitting the laser beams from the ground transmitting terminal to the HAP 2 by using an anisotropic non-Kolmogorov turbulence model of the stratosphere, and the atmospheric turbulence parameters indicate an effect of an anisotropy factor on transmission characteristics of the laser beams. The HAP 2 includes a multi-aperture receiver 201 configured to receive the laser signals from branches of the multi-aperture receiver 201, the multi-aperture receiver 201 is further configured to perform in-phase processing on the laser signals to obtain processed laser signals, then combine the processed laser signals by using an equal gain combination (EGC) method to obtain combined laser signals, and transmit the combined laser signals to the satellite terminal 3 through a vacuum channel.

The satellite terminal 3 includes an optical receiving antenna 301, a photodetector 302, a preamplifier 303 and a demodulator 304. The optical receiving antenna 301 is configured to receive the combined laser signals, and send the combined laser signals to the photodetector 302; the photodetector 302 is configured to convert the combined laser signals to electrical signals; the preamplifier 303 is configured to amplify the electrical signals to obtain amplified electrical signals, and the demodulator 304 is configured to demodulate the amplified electrical signals to obtain original information. The demodulator 304 may include a filter circuit configured to filter out clutter and noise in the amplified electrical signals, thereby to obtain the original information.

The uplink between the ground transmitting terminal 1 and the HAP 2, and the uplink between the HAP 2 and the satellite terminal 3 are FSO links, and the uplink between the ground transmitting terminal 1 and the HAP 2, and the uplink between the HAP 2 and the satellite terminal 3 are configured to apply a HQAM to relieve an atmospheric turbulence effect, to thereby achieve data communication.

In the embodiment, the HAP 2 is located at an altitude of 17 to 32 km above the ground, in the stratosphere. The HAP 2 is driverless (i.e., it operates unmanned), and relieves cloud interference and optimizes transmission quality of the laser beams through adjusting a spatial position and an adaptive altitude. Transparency of the atmosphere in the stratosphere is good, air is extremely dry, and is less affected by weather phenomena such as cloud, rain and fog, and a spatial environment of the stratosphere is an ideal laser transmission channel. Meanwhile, a non-Kolmogorov effect of atmospheric turbulence in the stratosphere is more significant, thus the anisotropic non-Kolmogorov turbulence can better describe an effect of vortex on optical wave propagation in turbulent random media. In addition, the HAP 2 is used as a relay station to be connected with the ground and the satellite, and the HAP 2 retransmits or forwards the laser signals to expand a transmission distance, compensate for signal attenuation, and support long-distance communication. The HQAM principle used by a G-H-S uplink is as follows, original data is divided into two paths, a speed of data in each path is changed to half of a speed of the original data, the data in each path is converted to a multilevel signal through a bit encoder, and the multilevel signal in each path is multiplied with a pair of orthogonal modulation carriers to obtain a modulated signal, and the modulated signals in the two paths are summed and then output. The satellite terminal 3 is a LEO satellite, which operates at an altitude of 1000-5000 km above the ground, and the satellite terminal 3 is configured to perform ground communication, observation, and navigation.

Based on the above analysis, a power law spectrum of the anisotropic non-Kolmogorov turbulence model in the stratosphere is expressed as follows:

$$\phi_n(\kappa, h) = A(\alpha)\tilde{C}_n^2(h)\frac{\exp\left(\frac{\kappa^2}{\kappa_m^2}\right)}{\left(\kappa^2 + \kappa_0^2\right)^{\alpha/2}}, \quad 0 \le \kappa < \infty, \; 3 < \alpha < 4; \tag{1}$$

where

-continued $$\left\{1 - \exp\left[-\left(\frac{\sqrt{\gamma}}{<I> \eta\sqrt{\bar{\gamma}}}\right)^{\beta}\right]\right\}^{\alpha-1} ;$$

where $w_i$ represents a Gaussian-Hermite approximation coefficient for a point i of AOA fluctuations, $<I>$ represents an average received light intensity, $\alpha$ represents a shape parameter related to a receiving aperture, $\beta$ represents a shape parameter related to a scintillation index, $\eta$ represents a proportional parameter related to irradiation intensity, $\gamma$ represents a SNR, and $\bar{\gamma}$ represents an average SNR.

A formula of a BER of the G-H-S laser communication system using the HQAM is expressed as follows:

$$P_{BER(HQAM)} = \tag{3}$$

$$\sum_{m=1}^{n} H_m \frac{K_{NN} Q(\sqrt{\xi\gamma})}{2\sqrt{\gamma}} \left( \begin{array}{c} \frac{\alpha_1\beta_1}{\eta_1}\left(\frac{\sqrt{a_m}}{\sqrt{\gamma}<I>\eta_1}\right)^{\beta_1-1} \quad e^{a_m - \left[-\left(\frac{\sqrt{a_m}}{\sqrt{\gamma}<I>\eta_1}\right)\right]^{\beta_1}}\left(1 - e^{-\left(\frac{\sqrt{a_m}}{\sqrt{\gamma}<I>\eta_1}\right)^{\beta_1}}\right)^{\alpha_1-1} + \\ \frac{\alpha_2\beta_2}{\eta_2}\left(\frac{\sqrt{a_m}}{\sqrt{\gamma}<I>\eta_2}\right)^{\beta_2-1} \quad e^{a_m - \left[-\left(\frac{\sqrt{a_m}}{\sqrt{\gamma}<I>\eta_2}\right)\right]^{\beta_2}} \times \left(1 - e^{-\left(\frac{\sqrt{a_m}}{\sqrt{\gamma}<I>\eta_2}\right)^{\beta_2}}\right)^{\alpha_2-1} \end{array} \right) -$$

$$\left(\sum_{m=1}^{n} H_m \frac{K_{NN} Q(\sqrt{\xi\gamma})}{2\sqrt{\gamma}}\right)^2 \left( \begin{array}{c} \frac{\alpha_1\beta_1}{\eta_1}\left(\frac{\sqrt{a_m}}{\sqrt{\gamma}<I>\eta_1}\right)^{\beta_1-1} \quad e^{a_m - \left[-\left(\frac{\sqrt{a_m}}{\sqrt{\gamma}<I>\eta_1}\right)\right]^{\beta_1}}\left(1 - e^{-\left(\frac{\sqrt{a_m}}{\sqrt{\gamma}<I>\eta_1}\right)^{\beta_1}}\right)^{\alpha_1-1} + \\ \frac{\alpha_2\beta_2}{\eta_2}\left(\frac{\sqrt{a_m}}{\sqrt{\gamma}<1>\eta_2}\right)^{\beta_2-1} \quad e^{a_m - \left[-\left(\frac{\sqrt{a_m}}{\sqrt{\gamma}<I>\eta_2}\right)\right]^{\beta_2}} \times \left(1 - e^{-\left(\frac{\sqrt{a_m}}{\sqrt{\gamma}<I>\eta_2}\right)^{\beta_2}}\right)^{\alpha_2-1} \end{array} \right);$$

$$\tilde{C}_n^2(h)$$

represents a generalized structural constant in the anisotropic non-Kolmogorov turbulence model, k represents a spatial frequency, h represents an altitude of the anisotropic non-Kolmogorov turbulence, n represents an atmospheric refractive index, a represents a power law index, $$\kappa_m = \frac{C(\alpha)}{l_0}, \; \kappa_0 = \frac{2\pi}{L_0}, \; C(\alpha) = \left[\left(\frac{2\pi}{3}\right)\Gamma(5 - 0.5\alpha)A(\alpha)\right]^{1/(\frac{\alpha}{5})},$$

$$A(\alpha) = 0.25\pi^{-2}\Gamma(\alpha - 1)\cos(0.5\pi\alpha),$$

$l_0$ represents an inner scale of the anisotropic non-Kolmogorov turbulence, and $L_0$ represents an outer scale of the anisotropic non-Kolmogorov turbulence.

The G-H-S uplink follows an exponentiated Weibull (EW) distribution, and a closed expression of a probability density function (PDF) of an EW distribution channel model with respect to $\gamma$ is as follows:

$$f_\gamma(\gamma) = \frac{1}{2\sqrt{\gamma\bar{\gamma}}}\sum_{i=1}^{\infty} w_i \frac{\alpha\beta}{\eta}\left(\frac{\sqrt{\gamma}}{\eta\sqrt{\bar{\gamma}}}\right)^{\beta-1}\exp\left[-\left(\frac{\sqrt{\gamma}}{<I>\eta\sqrt{\bar{\gamma}}}\right)^{\beta}\right] \times \tag{2}$$

where $\alpha_1$, $\beta_1$, and $\eta_1$ represent parameters of the ground-HAP uplink (i.e., the uplink between the ground transmitting terminal 1 and the HAP 2), $\alpha_2$, $\beta_2$, and $\eta_2$ represent parameters of the HAP-satellite uplink (i.e., the uplink between the HAP 2 and the satellite terminal 3).

$$H_m = \frac{\Gamma(n + 1/2)a_m}{n!(n+1)^2\left[L_n^{-\frac{1}{2}}(a_m)\right]^2},$$

$a_m$ represents a root of a generalized Laguerre polynomial $$L_n^{-\frac{1}{2}}(x), \; K_{NN} = 2\left(3 - \frac{4}{\sqrt{M}} + \frac{1}{N}\right),$$

and M and N are positive integers.

In order to verify the G-H-S laser communication system based on the anisotropic non-Kolmogorov turbulence proposed by the disclosure, and the G-H-S laser communication system is verified through a numerical simulation, and then a correctness of the numerical simulation result is verified by using a Monte Carlo method. In the G-H-S laser communication system, an atmospheric refractive index structure constant is $1.7 \times 10^{-14}$, an anisotropy factor u is individually 1 and 3, an altitude $H_p$ of the HAP 2 is 20 km, an altitude H of the satellite is 3600 km, a length $L_1$ of a FSO link between the ground transmitting terminal 1 and the HAP 2 is 40 km, a length $L_2$ of a FSO link between the HAP 2 and the satellite terminal 3 is 7160 km, an optical wavelength A is 1550 nanometers (nm), a wind speed v is 21 meters per second (m/s), a transmitting radius $w_0$ is 0.1 meter (m), a receiving diameter D is 0.2 m, and a zenith angle $\xi$ is 30°.

Figure 2:
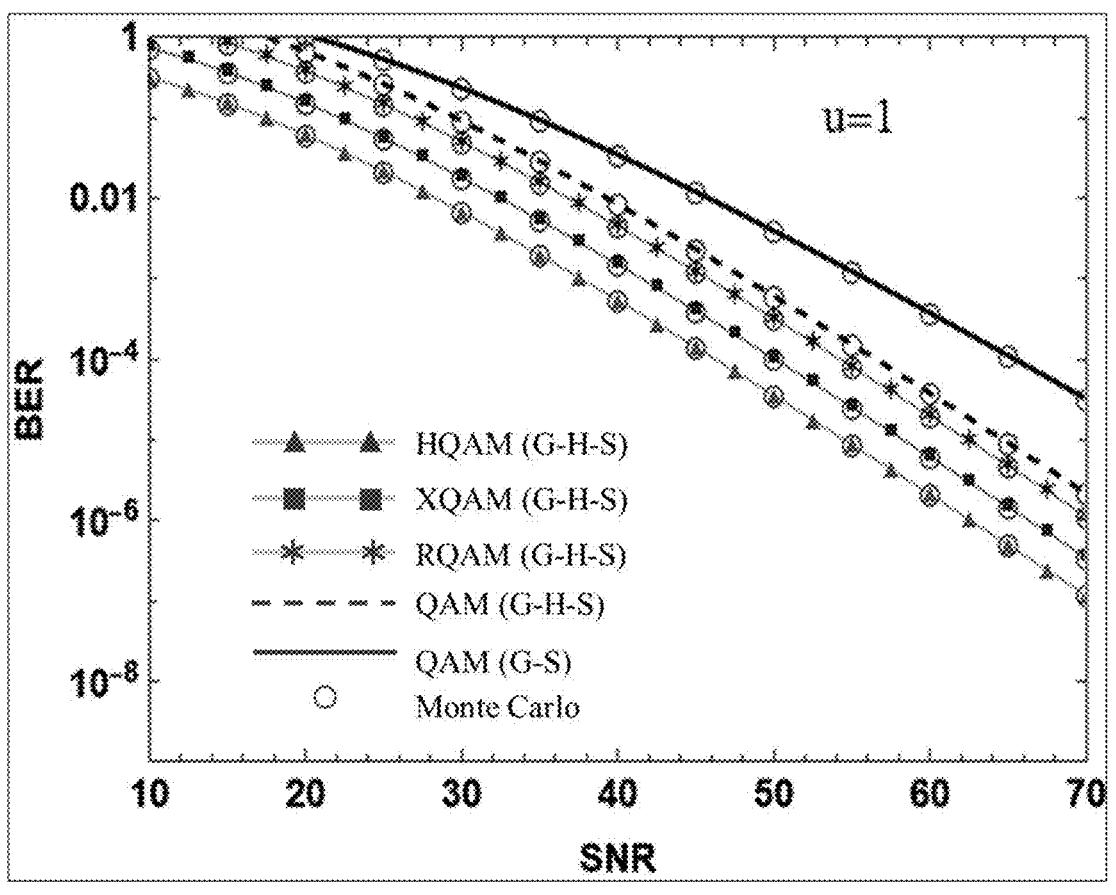
FIG. 2 illustrates a schematic diagram of a numerical simulation and a Monte Carlo validation of a system signal-to-noise ratio (SNR) and a BER when an anisotropy factor $u=1$ according to an embodiment of the disclosure.
Figure 3:
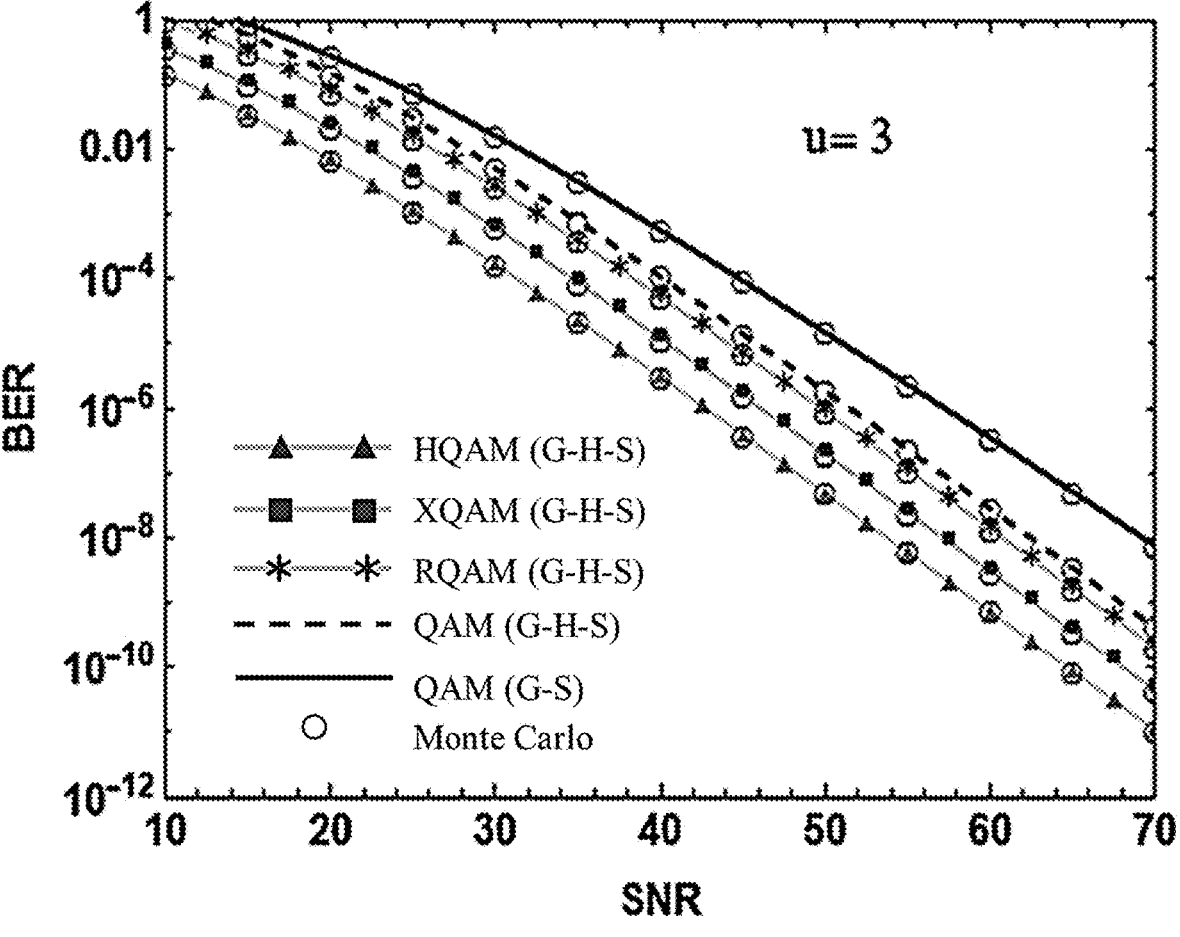
FIG. 3 illustrates a schematic diagram of a numerical simulation and a Monte Carlo validation of the system SNR and the BER when the anisotropy factor $u=3$ according to an embodiment of the disclosure.

FIG. 2 shows variation of SNR of HQAM, cross quadrature amplitude modulation (XQAM), rectangular quadrature amplitude modulation (RQAM), and quadrature amplitude modulation (QAM) with BER at the anisotropy factor u=1, and FIG. 3 shows variation of SNR of HQAM, XQAM, RQAM and QAM with BER at the anisotropy factor u=3. The results show that the BER not only decreases with the increase of SNR, but also decreases with the increase of the anisotropy factor. As shown in FIG. 2 and FIG. 3, the BER of the G-H-S system under four modulation schemes gradually decreases. When the SNR is the same, the G-H-S system with the HQAM has the lowest BER. When the BER is the same, the SNR of the G-H-S system with the HQAM is minimum. Meanwhile, the BER of the G-H-S system and an BER of a ground-satellite (G-S) system monotonically decrease with the increase of the SNR. When the SNR is small, a difference in the BERs between the G-H-S system and the G-S systems is small. The difference in the BERs is increased with the increase of the SNR. Compared to the system using the HAP, the G-S system has a high BER. For example, when the SNR is 22 decibels (dB), and u=1, the BERs of the G-H-S system and the G-S system are respectively $2.17\times10^{-6}$ and $3.23\times10^{-5}$. However, with the increase of the value of the anisotropy factor u, an effect of the turbulence on the transmitted laser beams is reduced, and the BER of the system is further reduced. In order to reach a same BER $10^{-7}$, a required SNR of the G-H-S system with the HQAM is 70 dB when the anisotropy factor u=1. Compared to the G-H-S system with the HQAM when u=3, the required SNR is increased by 20 dB. Therefore, the G-H-S system with the HQAM can obtain a lower BER by using the HAP to assist the ground-satellite uplink, and an adoption of the HQAM can better relieve an adverse effect of the atmospheric turbulence on the G-H-S system, so as to further improve the stability of the G-H-S system.

A research result shows that the adoption of the HQAM technology in the G-H-S laser communication system based on the anisotropic non-Kolmogorov turbulence can better relieve the effect of the atmospheric turbulence. Therefore, the G-H-S system with the HQAM can effectively improve a performance of a satellite-ground laser communication system.

The embodiments of the disclosure further provide a communication method of the G-H-S laser communication system based on the anisotropic non-Kolmogorov turbulence as described in the first aspect, and the communication method includes the following steps 1 to 4.

In step 1, the ground transmitting terminal transmits the laser beams, the MZ modulator receives the laser beams to obtain the laser signals. The MZ modulator transmits the laser signals to the HAP upwards through the uplink between the ground transmitting terminal and the HAP.

In step 2, the multi-aperture receiver of the HAP receives the laser signals, and the laser signals are decoded to obtain a decoded result by using a decode-forward relay protocol. The decoded result is recoded to obtain recoded laser signals. The recoded laser signals are combined to obtain combined laser signals by using the EGC method.

In step 3, the HAP transmits the combined laser signals to the satellite terminal upwards through the vacuum channel.

In step 4, the satellite terminal receives the combined laser signals transmitted from the HAP.

Other embodiments of the disclosure will easily occur to those skilled in the art after considering the specification and practicing the disclosure herein. The disclosure aims to cover any variations, uses, or adaptive changes of the disclosure, which follow general principles of the disclosure and include common knowledge or customary technical means in the technical field not disclosed in the disclosure. The specification and embodiments are only considered exemplary, and a true scope and spirit of the disclosure are indicated by the claims.

It should be understood that the disclosure is not limited to a precise structure described above and shown in the drawings, and various modifications and changes can be made without departing from its scope. The scope of the disclosure is limited only by the claims.

What is claimed is:

1. A ground-high altitude platform-satellite (G-H-S) laser communication system based on anisotropic non-Kolmogorov turbulence, comprising: a ground transmitting terminal, a high-altitude platform (HAP), and a satellite terminal;

wherein the ground transmitting terminal comprises a laser transmitter and a Mach-Zehnder (MZ) modulator, the laser transmitter is configured to transmit laser beams to the MZ modulator, the MZ modulator is configured to modulate the laser beams to obtain laser signals with different intensities after receiving the laser beams and transmit the laser signals to the HAP;

wherein the HAP is a geostationary satellite as a relay station, the HAP is located at stratosphere, and the HAP is configured to analyze atmospheric turbulence parameters during transmitting the laser beams from the ground transmitting terminal to the HAP by using an anisotropic non-Kolmogorov turbulence model of the stratosphere, and the atmospheric turbulence parameters indicate an effect of an anisotropy factor on transmission characteristics of the laser beams; and the HAP comprises a multi-aperture receiver, and the multi-aperture receiver is configured to receive the laser signals from branches of the multi-aperture receiver, perform in-phase processing on the laser signals to obtain processed laser signals, combine the processed laser signals by using an equal gain combination (EGC) method to obtain combined laser signals, and transmit the combined laser signals to the satellite terminal through a vacuum channel; and wherein the satellite terminal comprises an optical receiving antenna, a photodetector, a preamplifier and a demodulator, the optical receiving antenna is configured to receive the combined laser signals, and send the combined laser signals to the photodetector, and the photodetector is configured to convert the combined laser signals to electrical signals, the preamplifier is configured to amplify the electrical signals to obtain amplified electrical signals, and the demodulator is configured to demodulate the amplified electrical signals to obtain original information;

wherein an uplink between the ground transmitting terminal and the HAP, and an uplink between the HAP and the satellite terminal are free-space optical communication (FSO) links, and the uplink between the ground transmitting terminal and the HAP, and the uplink between the HAP and the satellite terminal are configured to apply a hexagon quadrature amplitude modulation (HQAM) to relieve an atmospheric turbulence effect, to thereby achieve data communication.

2. The G-H-S laser communication system as claimed in claim 1, wherein the HAP is located at an altitude of 17 to 32 kilometers (km) in the stratosphere.

3. The G-H-S laser communication system as claimed in claim 1, wherein a power-law spectrum of anisotropic non-Kolmogorov turbulence in the stratosphere is expressed as follows:

$$\phi_n(\kappa, h) = A(\alpha)\tilde{C}_n^2(h)\frac{\exp\left(\frac{\kappa^2}{\kappa_m^2}\right)}{\left(\kappa^2 + \kappa_0^2\right)^{\alpha/2}}, \; 0 \le \kappa < \infty, \; 3 < \alpha < 4;$$

wherein $$\tilde{C}_n^2(h)$$

represents a generalized structural constant in the anisotropic non-Kolmogorov turbulence, K represents a spatial frequency, h represents an altitude of the anisotropic non-Kolmogorov turbulence, n represents an atmospheric refractive index, a represents a power-law index, $$\kappa_m = \frac{C(\alpha)}{l_0}, \; \kappa_0 = \frac{2\pi}{L_0}, \; C(\alpha) = \left[\left(\frac{2\pi}{3}\right)\Gamma(5 - 0.5\alpha)A(\alpha)\right]^{1/\left(\frac{\alpha}{5}\right)},$$

$$A(\alpha) = 0.25\pi^{-2}\Gamma(\alpha - 1)\cos(0.5\pi\alpha),$$

$l_0$ represents an inner scale of the anisotropic non-Kolmogorov turbulence, and $L_0$ represents an outer scale of the anisotropic non-Kolmogorov turbulence.

4. The G-H-S laser communication system as claimed in claim 1, wherein the satellite terminal is a lower Earth orbit (LEO) satellite, and the satellite terminal is configured to perform ground communication, observation, and navigation.

5. The G-H-S laser communication system as claimed in claim 1, wherein a principle of the HQAM is as follows: original data is divided into two paths at a transmitter, a speed of data in each path is changed to half of a speed of the original data, the data in each path is converted to a multilevel signal through a bit encoder, the multilevel signal in each path is multiplied with a pair of orthogonal modulation carriers to obtain a modulated signal, and the modulated signals in the two paths are summed and then output.

6. The G-H-S laser communication system as claimed in claim 5, wherein the HQAM applies a bidirectional modulator to decompose the multilevel signal in each path into two components including an in-phase and a quadrature-phase, modulate the in-phase and the quadrature-phase of the multilevel signal onto the orthogonal modulation carriers respectively, to thereby transmit a plurality of data symbols, and an expression of the modulated signal s(t) is expressed as follows:

$$s(t) = \sqrt{\frac{2}{T}}\,(A_i\cos(wt) + B_j\sin(wt));$$

$$A_i = \pm(2i - 1);$$

$$B_j = \pm(2i - 1);$$

wherein $A_i$ and $B_j$ represent amplitudes of the in-phase and the quadrature-phase, respectively; w represents an angular frequency, i and j are positive integers, and T represents a period.

* * * * *